United States Patent [19]

Bunker et al.

[11] Patent Number: 4,811,245
[45] Date of Patent: Mar. 7, 1989

[54] METHOD OF EDGE SMOOTHING FOR A COMPUTER IMAGE GENERATION SYSTEM

[75] Inventors: William M. Bunker; Donald M. Merz; Richard G. Fadden, all of Ormond Beach, Fla.

[73] Assignee: General Electric Company, Syracuse, N.Y.

[21] Appl. No.: 810,738

[22] Filed: Dec. 19, 1985

[51] Int. Cl.[4] .............................................. G06F 3/14
[52] U.S. Cl. .................................... 364/521; 340/723; 340/729; 364/518
[58] Field of Search ....................... 364/518, 521, 424; 340/703, 724, 729, 750, 798–800

[56] References Cited

U.S. PATENT DOCUMENTS

| | | | |
|---|---|---|---|
| 4,179,824 | 12/1979 | Marsh | 364/521 X |
| 4,475,104 | 10/1984 | Shen | 364/521 X |
| 4,549,275 | 10/1985 | Sukonick | 364/521 |
| 4,631,690 | 12/1986 | Corthout et al. | 364/521 X |

Primary Examiner—Gary V. Harkcom
Assistant Examiner—H. R. Herndon
Attorney, Agent, or Firm—Stephen A. Young

[57] ABSTRACT

A method for computer image generation simulated visual scenes for applications such as flight training. The processing to generate the image takes place in three sequential stages: Controller, Geometry Processor, and Display Processor. At any point in time, the stages are processing data for three consecutive scenes. Each scene is comprised of a plurality of faces. Processing prior to the Display Processor accomplishes clipping and perspective transformation of faces. The Display Processor then generates the scene with pipeline processing accomplishing four major tasks: span detection or windowing, span sequencing, mask processing, and color processing. The improved realism of the computer generated image includes application of area-times-color smoothing, using fractional face areas to improve scene quality and reduce quantizing artifacts.

19 Claims, 7 Drawing Sheets

SPAN 36

FIG-4

| SEARCH DIRECTION TABLE | | | | |
|---|---|---|---|---|
| D AT SPAN CORNERS | | | | SEARCH DIRECTION |
| 1 | 2 | 3 | 4 | |
| − | − | + | + | E (EAST) |
| + | − | + | + | |
| − | − | + | − | |
| 0 | 0 | + | + | |
| + | + | − | + | S (SOUTH) |
| + | − | − | + | |
| − | − | − | + | |
| 0 | − | − | 0 | |
| + | + | − | − | W (WEST) |
| + | − | − | − | |
| + | + | + | − | |
| 0 | 0 | − | − | |
| − | + | + | − | N (NORTH) |
| − | + | + | + | |
| − | + | − | − | |
| 0 | + | + | 0 | |
| − | 0 | + | 0 | NE (NORTH-EAST) |
| − | 0 | + | + | |
| − | 0 | + | − | |
| 0 | − | 0 | + | SE (SOUTH-EAST) |
| + | − | 0 | + | |
| − | − | 0 | + | |
| + | 0 | − | 0 | SW (SOUTH-WEST) |
| + | − | − | 0 | |
| + | + | − | 0 | |
| 0 | + | 0 | − | NW (NORTH-WEST) |
| 0 | + | − | − | |
| 0 | + | + | − | |

FIG-5A

| DIRECTION KEY | | |
|---|---|---|
| NW | N | NE |
| W | 1  2<br>PRESENT<br>SPAN<br>4  3 | E |
| SW | S | SE |

METHOD OF EDGE SMOOTHING FOR A COMPUTER IMAGE GENERATION SYSTEM

FIELD OF THE INVENTION

This invention relates generally to the field of computer image (CIG) systems, and more particularly, it relates to area processing of an image comprised of faces for use in real time imaging systems.

BACKGROUND OF THE INVENTION

Real-time computer image systems are being designed to provide realistic image reproduction for a variety of simulator systems, such as tank simulators and flight simulators. Such simulators are used as training devices which permit a combatant to obtain practice without the necessity of going out into the field and using the actual combat systems. They enable a user, such as a pilot or tank gunner, to maintain and improve his skills without the cost associated with live training. It is thus very advantageous to provide the user with video display realism which is beneficial for training and practice purposes.

In a typical real time computer image generation system, such as a flight simulator system, image generation can be broken into three separate processing stages: Controller, Geometry Processor, and Display Processor. These three processing stages or sections each work independently on data representative of or corresponding to one of three consecutive scenes to be displayed. The Controller processes data on a scene or image for a fixed time, which may be either a field time of 16.67 milliseconds or a frame time of 33.3 milliseconds, usually the former, and then passes its processed data to the Geometry Processor. This particular field and frame time corresponds to that time for a typical television format display, i.e., two interlaced fields per frame with thirty frames per second. The Geometry Processor has an equal time to do its calculations and at the end of that time its results are sent to the Display Processor. The Display Processor always processes one interlace field for a video display in one field time. For each time interval, all three processors are kept busy, so at any given time the processors are working on three separate scenes. Each section processes inputs and generates outputs during the interval, so data flows through the three stages in a sequential manner. The computational load is spread out among the specialized processor sections, so this allows new scenes to be displayed each field or frame time, even though the results are delayed three fields or frames.

For example, in a flight simulator system, pilot inputs are received by the Controller and after being processed sequentially by the Controller, the Geometry Processor and Display Processor, the output is sent as a color scene to video displays observed by the pilot in the simulator. The data seen by the pilot starts out as simple control inputs applied to an environment definition and is converted to pixel video display information. In the Controller, the pilot inputs are used to calculate the new position and orientation of the aircraft, and from this, a mathematical rotation matrix is calculated that is used to rotate objects from the reference coordinate system to a display coordinate system. Any other information dealing with the aircraft, with the position of targets and with other aircraft is also calculated in the Controller. In some applications, the Controller is a general purpose computer.

The Geometry Processor reads, from a database, descriptions of objects that are potentially visible in the stored three dimensional digital representation of the scene. The objects that are read are rotated into display coordinates using the rotation matrices calculated in the Controller. Edges of these three-dimensional objects are clipped by the Geometry Processor if they extend beyond the view window boundaries. The Geometry Processor mathematically projects the three-dimensional data onto the two-dimensional display window. Object faces which extend beyond display window boundaries are clipped in two-dimensional image space. In addition, the Geometry Processor calculates which objects are in front or behind other objects and stores this information in a priority list. Each object processed is made up of individual faces, where each face is in the form of a polygon bounded by straight edges. The priority list contains the order of all faces in the scene, with the first face in the list as the highest priority face, and the last face in the list as the lowest priority face. Whenever two faces overlap on the display, the higher priority face will be visible, and the lower priority face will be obscured. Lastly, the Geometry Processor calculates the display end points for the line segments that bound the two dimensional faces, and also calculates the coefficients of the line equations that describe the bounding edges.

The Display Processor receives the two dimensional face descriptions, along with face color, face fading information, a face priority list, cell texturing, level of detail blending, translucency, curvature shading, etc; and uses this information to output the scene to a color display. Each color display in the system is typically made up of 1024 lines of video information, with each line having 1024 individual color dots or pixels. However, other combinations of lines and pixels per line are certainly possible. The Display Processor has to resolve, for each pixel, what the color of the pixel should be, given that many faces can be present in a pixel, and that certain portions of faces may be covered by other faces. Since there can be 1024 by 1024 pixels in the display, and all these need to be calculated in 1/60th of a second, the processing load in the Display Processor is very high. To calculate video for a multi-display system (a single system has contained as many as 14 displays), the Display Processor must perform in excess of 10 billion computations per second. Due to the tremendous processing load, a Display Processor can drive only a few displays. In some systems, a single Controller and Geometry Processor can be used to drive several Display Processors with several displays connected to each Display Processor. The Display Processor therefore represents the majority of processing in a real time computer image generation system, and for this reason most of the effort to improve the capabilities and realism of a CIG system is concentrated in the Display Processor area.

One particular problem that decreases realism is the stair-step edge that occurs in a computer generated image. This happens because the edge on the video display is caused by the discrete changes in the pixel intensity inherent in digital data. One approach to improving a video scene realism and eliminating the stair-step effect is to process the area boundaries with geometric smoothing. In geometric smoothing an area calculation is made for each edge through a pixel. However, it was found that this method would give frequent glitches in the computer generation screen if more than two edges of a face pass through a pixel.

It is an object of this invention to provide an economical edge smoothing process which improves the realism of a computer generated image.

It is an object of the present invention to provide a method for Display Processor calculations that reduces the processing in a real time computer image generation system while decreasing the computional time of the Display Processor.

It is still a further object of the present invention to provide an edge-smoothing technique that decreases the processing load of a computer image generation system.

It is a further object to provide a method in which an unlimited number of edges can be processed through a pixel, to provide in real time a noise-free video display.

A more specific object of the present invention is the application of area times color smoothing, using fractional face areas to improve the edges of a face.

SUMMARY OF THE INVENTION

The present invention improves the realism of a computer generated video image by improving the capabilities of the Display Processor processing unit. The processing of faces through the Display Processor consists of four major tasks: span detection or windowing, span sequencing, mask processing, and color processing.

Span detection is the process of detecting spans intersected by an edge of a face. The edges of a face are tracked in a clockwise direction about the face, so that the face is always to the right, to identify spans which they intersect. Spans are small rectangular areas of the display which are fixed in size. A span is composed of a matrix of pixels, for example 8 scan lines by 8 pixels, and basically is fixed in position on a video display.

During span detection the set of spans that contains portions of a face is found and identified. Some spans on the boundary of a face will contain only a small portion of the face and are identified and stored in a memory via a linked list. Other spans completely covered by a face are identified also, for later processing in the mask processing task.

The span data preprocessor, which does the span sequencing, acts as a buffer and controller between the span detector and the mask processor. The span sequencer receives span data from the span detector and orders the data in span lists. It assigns spans, in row sequence, to the mask processor. It then accesses the next feature of a span from the span detector and outputs it to the mask processor. When the processing of a span is complete, the mask processor notifies the span data preprocessor. The span data preprocessor then assigns a new span to the sequence, and outputs the new span to the mask processor.

The faces which intersect or cover a span are processed one at a time to determine a per-pixel area contribution of the face to the generated scene. Faces in the span are processed in decreasing priority sequence in which case output from the span data preprocessor will stop with the output of a non-translucent covering face or when the span is full, whichever occurs first.

In the mask processing task, each pixel of a span is sampled as 16 subpixels, areas rather than points, to determine the area of a face that is visible within the pixel. A subpixel area is 1/16th the area of a pixel and is fixed in position within the pixel. Subpixels intersected by a face span are determined by identifying and logically ANDing those subpixels intersected by each edge of that face span. In order to resolve priority conflicts within a span, given the priority list, the face span occurances for a given span are processed in order, starting with the highest priority face and ending with the lowest priority face. As the subpixel areas for the highest priority face are found, they are accumulated in a span mask memory. This mask is used, as subsequent faces are processed, to prevent these faces from over-riding any part of a higher priority face. The subpixel mask memory contains 16 bits, 1 bit per subpixel, for each pixel of the span. This mask is updated as each face is processed and is used to subtract out any portion of the face already covered within the span. Thus, while processing a span, a record of accumulated subpixels covered by the span features is maintained to determine the contribution of the newest feature.

The generation of the subpixel span mask is accurate in position and area to the subpixel resolution. The mask is accurate in position within the span to one subpixel or better and is accurate in area to one-half subpixel per-pixel or better. Span processing also includes mask modification to simulate translucency, the accumulation of successive faces in the span to determine the per-pixel area contribution of each face, and the detection of when the span is full.

In the color processor, the per-pixel area of a span face is received from mask processing. The contribution of this face to each display pixel of the span is determined by color processing. Color processing includes consideration of factors known to those skilled in the art, including: area weighting for field interlace display, color, haze, illumination, and modulation effects. The latter may be various forms of texturing and/or curved surface shading. The color processor accumulates per-pixel color for successive faces of the span, as 12-bits each of red, green, and blue. When the span is full, the color processor outputs the span scene data to the display storage to be viewed by the pilot or trainee.

DESCRIPTION OF AN ILLUSTRATIVE EMBODIMENT

A. General Description of the Computer Image Generation System

Figure 1:
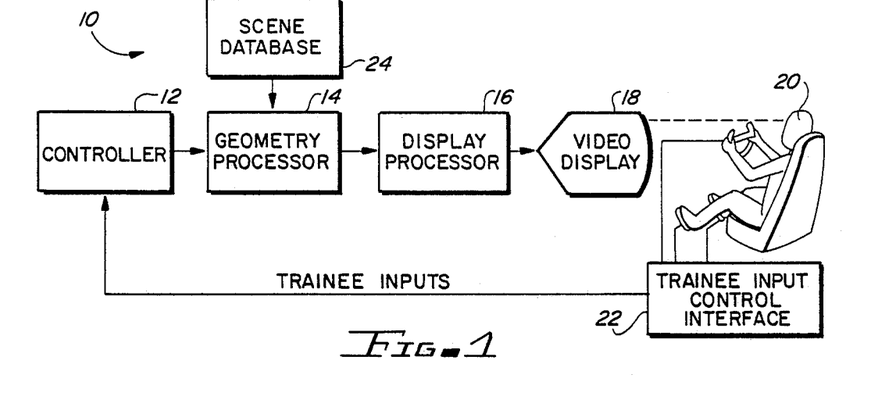
FIG. 1 illustrates a functional block diagram of a computer image generation system for a training simulator.

FIG. 1 illustrates a functional block diagram of a computer image generation system such as an aircraft cockpit simulation system. The system, generally designated by the reference numeral 10, includes a Controller unit 12, a Geometry Processor unit 14, and a Display Processor unit 16. The Display Processor unit 16 displays information to a cockpit display window 18 to simulate the movement of the aircraft over a scene. A pilot-trainee 20 is linked to the computer image generation system 10 through input control interface 22. The pilot's maneuvering action in the cockpit is fed to input control interface 22. The input control interface converts the appropriate flight data such as aircraft position, aircraft roll, pitch, and yaw attitude, from the pilot to the Controller 12.

In the Controller 12, the pilot inputs are used to calculate a new position and orientation of the aircraft, and from this, a mathematical rotation matrix is calculated that is used to rotate objects from the reference coordinate system to a display coordinate system, which is well known in the art. Other information dealing with the scene, the position of targets, or other aircraft is calculated in the Controller. In some computer image generation systems the Controller unit is a general purpose computer.

The Controller unit 12 is updated periodically by the most recent aircraft orientation. This orientation includes the aircraft roll, pitch, and yaw, and position from the pilot via the input control interface 22, to the Controller 12. The Controller 12 works on a scene for a field or frame time and then passes data to the Geometry Processor 14.

The Geometry Processor 14 reads from a scene database memory 24, descriptions of objects such as towers, roads, rivers, hangars, etc., that are potentially visible in the stored three dimensional digital representation of the earth. The objects are read from the scene database and are rotated into display coordinates using the rotation matrix calculated in the Controller 12. The Geometry Processor 14 clips all edges which extend beyond the view window boundaries. It mathematically projects the three-dimensional object data onto the two-dimensional display window. Object faces which extend beyond display window boundaries are clipped in two-dimensional image space. The two dimensional objects consist of points, lines, closed convex polygons, or combinations thereof. Each closed convex polygon is known as a face. Thus, each object processed is made up of individual faces, where each face is bounded by straight edges. Once the faces are computed from the three dimensional objects, in the Geometry Processor 14, the data is passed to the Display Processor 16. In addition, the Geometry Processor 14 calculates which faces are in front or behind other faces and stores this information in a priority list. The priority list contains the order of all faces in the scene where the first face in the list is the highest priority face, and the last face in the list is the lowest priority face. Whenever two faces overlap on a display, the high priority face will be visible and the overlap portion of the low priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

In FIG. 1, there is shown Display Processor 16 that is used to drive the video display 18. In some systems, a single Controller 12 and Geometry Processor 14 is used to drive more than one Display Processor. The Display Processor 16 represents the majority of processing and hardware in a real time computer generation system and, for this reason, most of the effort to reduce the size of the hardware and processing time has been concentrated in the Display Processor area. The Display Processor is responsible for processing information to be displayed on video display 18. The Display Processor 16 has to resolve for each pixel in the video display 18 what the color of the pixel should be, given the many faces that can be present in a pixel, and those portions of faces that may be covered by other faces. After resolving the priority conflicts within a pixel, the area of each visible face within the pixel is multiplied by the color of the face, and the sum of all these weighted colors is output as a pixel color. Since there may be more than one million pixels in the display, and all of these need to be calculated in 1/60th of a second, the processing load in the Display Processor is very high. The Display Processor 16 receives two-dimensional face descriptions from the Geometry Processor 14, along with the face color, and a face priority list, and uses this information to output the scene to color video display 18. Each color display in a system can be made up of 1,024 lines of video information and on each line there are 1,024 individual color dots or pixels. For each pixel the display receives 12 bits of red, 12 bits of green, and 12 bits of blue intensity information that describe the color of the pixel.

B. Video Display Representation of Faces, Spans, Pixels and Subpixels

1. Span Representation

Figure 2:
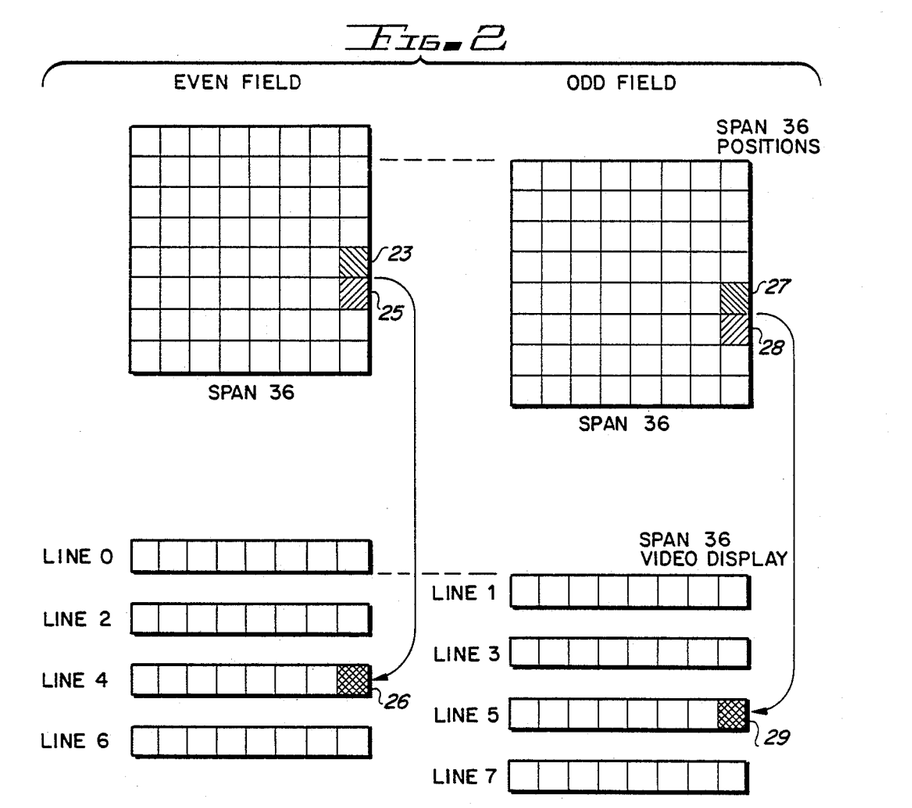
FIG. 2 illustrates an even field and odd field interlace for a video display.

The Display Processor 16 processing consists of the generation and the processing of spans. Spans are small rectangular areas of display fixed in size and shape which cover the view window. Ideally, the position of a span is fixed in position on a video display. However, the position of the span is changed vertically by one scan line by the even and odd field refresh of the video display. Referring to FIG. 2, there is shown the even field and odd field of a span 36. The odd and even fields are interlaced to form 30 complete frames, or images, per second in a manner well known in the art. The span 36 is shown displaced vertically one scan line of the odd field from the even field. Span pixel pairs 23 and 25 form display pixel 26 during the even refresh and span pixel pairs 27 and 28 form display pixel 29 during the odd refresh. During each field time all pixels in the span are processed to generate the display lines, the two fields being interlaced to form the video display image. Thus, a display pixel for one field is formed from two span pixels.

Figure 3:
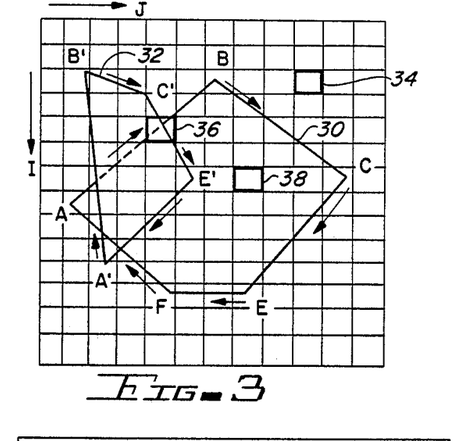
FIG. 3 shows two faces intersecting a set of spans in a view window.

During span detection the set of spans that contain portions of a face is found, some spans at the boundary of the face will contain only a small portion of the face, and some spans will be completely covered by the face. FIG. 3 shows a face 30 and a face 32 and the set of spans that needs to be identified in order to process the faces in detail. The span 34 is outside the face 30 and face 32. The span 38 is wholly contained within the face 30 and not within face 32 and the span 36 is on the edge of the face 30 and face 32. The part of the face that lies within each span is processed in detail by the span processing of the Display Processor.

The two dimensional face 30 is bounded by 5 edges; A-B, B-C, C-E, E-F, and F-A. Face 32 is bounded by line segments A′-B′, B′-C′, C′-E′, E′-A′. Each edge is defined by both the endpoints of the line segment and by a line equation of the form:

$$D = LO + LI*I + LJ*J \quad \text{(Eq. 1)}$$

Where D is the perpendicular distance from a point (I,J) to an edge, LO is an initial distance determined in the Geometry Processor from a fixed reference point such as I=0 and J=0, LI is the cosine of the edge slope and LJ is the sine of the edge slope.

Figure 4:
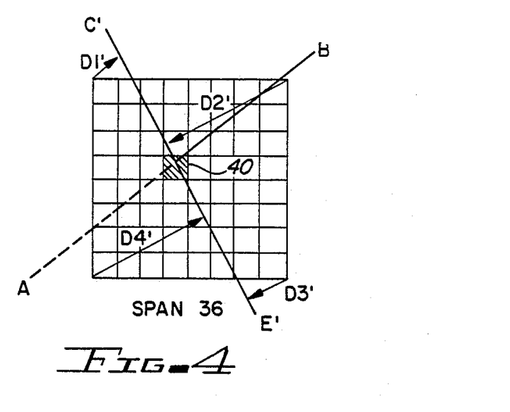
FIG. 4 is an expanded view of a span.

Referring to FIG. 4, there is shown an expanded view of span 36 of FIG. 3. Span 36 is composed of an 8×8 matrix of pixels. Pixel 40 is shown in relative location to the rest of the pixels.

Edge A-B of face 30 and edge C′-E′ of face 32 are shown. Edge A-B and C′-E′ both pass through pixel 40. Pixel 40 is almost completely covered by a combination of face 32 and face 30 respectively bounded by edges C′-E′ and A-B. D1′, D2′, D3′ and D4′ are the perpendicular distances from the corners of the span to edge C′-E′. The distances D1′, D2′, D3′ and D4′ are computed using equation 1. As will be explained later, each face is scanned along the boundary of the face, one edge at a time, in a clockwise direction and always in a clockwise direction. Using equation 1, and since the edge is scanned from C′ to E′, the distances D1′, D2′, D3′ and D4′ are easily computed. In our example, D1′ is positive, D2′ is negative, D3′ is negative and D4′ is positive. The next span that the edge C′-E′ intersects can be easily determined by knowing the signs of these distances. For FIG. 4, the next span which C′-E′ will intersect is the span directly below or south of span 36.

Figures 5A, 5B:
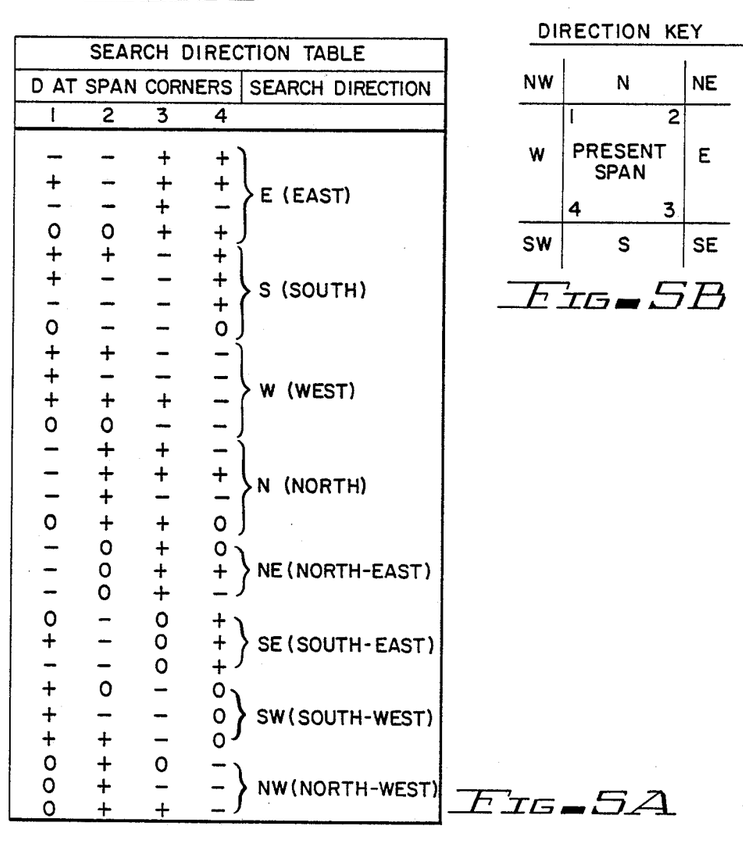
FIG. 5A shows a search direction table for determining the next span intersected by an edge.
FIG. 5B is a direction key for use with the lookup table data, of FIG. 5A for establishing a search direction.

Using this information a table can conveniently be used to determine the next span an edge will probably intersect. FIG. 5A shows a search direction table without comprehensive distortion correction which is used to compute the next span an edge will intersect. The sign and magnitude of each distance D1 through D4 will uniquely determine the next span to search. Using a lookup table for a search direction decreases computation time, since no computations must be done. For example, referring back to FIG. 4, since D1′ is positive, D2′ is negative, D3′ is negative and D4′ is positive, the search direction table uniquely determines that the next span that is intersected by edge C′-E′ is the span below (south of) span 36. An entry of zero in the search direction table signifies that the edge intersects the vertices. FIG. 5B is a direction key for use with the lookup table data of FIG. 5A for establishing a search direction.

The use of a lookup table to compute the intersection of the edge with the next span can be implemented in a table lookup read only memory (ROM), where the slope of the edge and end points are inputs into the address lines and the output from the memory lines are the perpendicular distances. Thus, the computational processing required to compute the spans intersected by an edge can be quickly and efficiently done using hardware. This decreases the computational time of the Display Processor and allows faster processing of the data.

2. Subpixel Representative for a Pixel

Figure 6A:
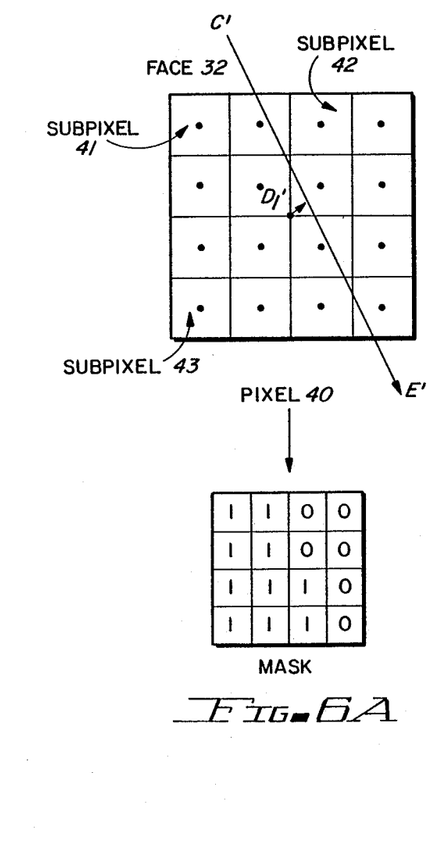
FIGS. 6A, 6B and 6C show an expanded view of a pixel and illustrate the generation of a subpixel mask.
Figures 6B, 6C:
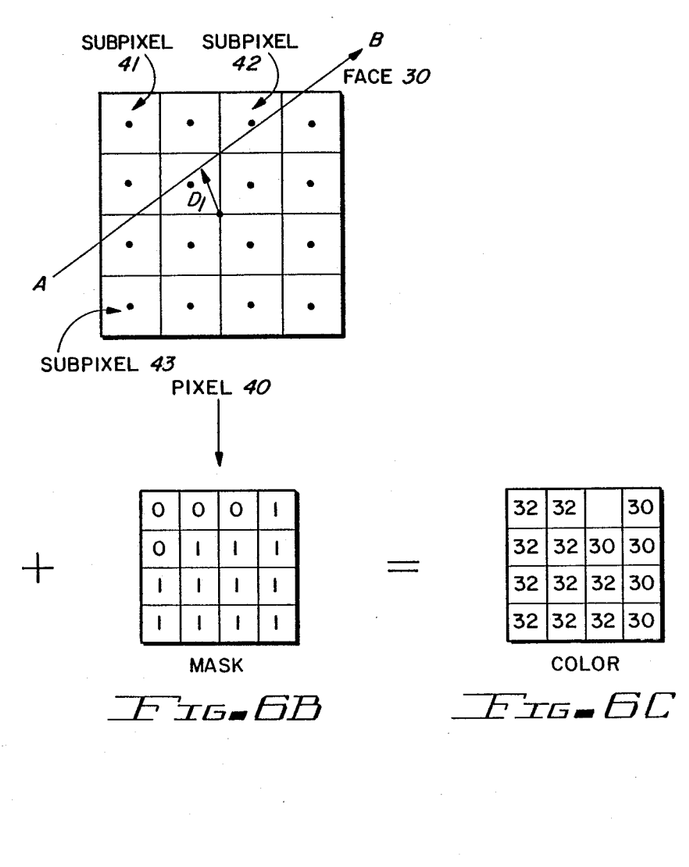

FIGS. 6A-B show the pixel 40 comprised of 16 subpixel areas. A subpixel is 1/16th the area of a pixel, i.e., 16 subpixel areas equal one pixel. It is important to note that the subpixels are actually areas and not points. Data from equation (1), distance and slope, can be used to determine the subpixels that are covered by a face. Thus in FIG. 6A, D1′, which is the perpendicular distance from the center of the pixel to edge C′-E′, is determined. The angle of the line is available from the coefficients LI′ and LJ′. By table lookup, distance and angle values determine those subpixels which lie on each side of the edge to a total area accuracy of one-half subpixel or better and a position accuracy of one subpixel or better. Since the edge was scanned in a clockwise direction D1′, is positive and the indicated subpixels to the right of edge C′-E′ (when travelling along the edge in the clockwise direction) are included in the face. For example, subpixel 41 is covered held by face 32. In FIG. 6B, however,, for edge A-B, D1 is positive but subpixel 41 lies to the left of edge A-B and therefore is not in face 30. Similarly, subpixel 42 does not lie in either face. Some subpixels, such as subpixel 43, lie in both faces. Such subpixels are assigned to the highest priority face, in this case face 32.

FIG. 6A shows the subpixel weight for face 32 in pixel 40 in form of a subpixel mask. FIG. 6B shows the subpixel weight for face 30 in pixel 40 in form of a subpixel mask. Since face 32 has priority over face 30 and is processed first, there will be 10/16ths unit of face 32 color and 5/16ths unit of face 30 color, or 15/16ths unit total as shown in FIG. 6C. To be complete a pixel must have a full unit of color. A third, lower priority face not identified in this example, will provide the missing color fraction. When all pixels of the span are completely filled, the processing is terminated since no other lower priority face can contribute to any pixel color. Thus, the span color can be quickly determined and can be implemented in hardware using a ROM lookup table as described before to decrease the computational time while giving face edges an accurate and realistic look.

Figure 7A:
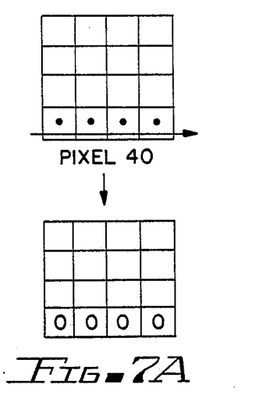
FIGS. 7A, 7B, 7C, 7D and 7E illustrate another generation of a subpixel mask.
Figure 7B:
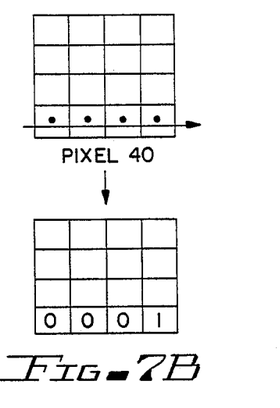
Figure 7C:
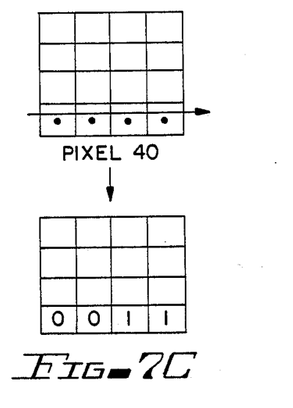
Figure 7D:
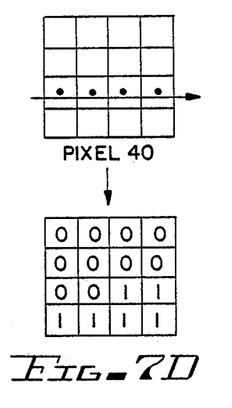
Figure 7E:
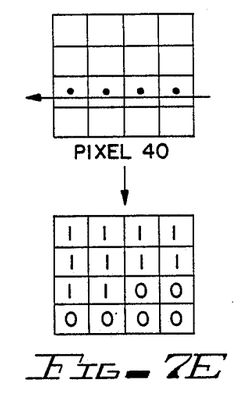

This example would seem to indicate that a subpixel is inside the face if its center is inside the face, as shown in FIGS. 6A and 6B. This however is not strictly true. Subpixels are assigned such that they best approximate the total area and position within the pixel. For instance, referring to FIG. 7A, if a horizontal edge is very close to the bottom of pixel 40 as shown in FIG. 7A, the weight of the subpixels in that row will be 0. However, if the edge is slowly moved upward, a point will be reached at which the area of the pixel covered by the edge face will be greater than one-half subpixel as shown in FIG. 7B. In this case the weight of one subpixel is modified to 1 even though the edge has not reached the center of any subpixel. In FIG. 7C the edge has moved further upward so that the pixel area exceeds one and one-half subpixels and the weight of a second subpixel is modified to one. In a similar manner, for any edge with any slope intersecting the pixel, subpixels are weighted to best approximate position and slope within the pixel. For instance, as shown in FIGS. 7D-E, if two faces do not overlap but share a common edge, the subpixels which are selected for the two faces will neither overlap nor leave empty spaces. This process results in a more realistic and accurate video display and can be easily implemented in digital logic or in a lookup table ROM.

Further, as illustrate in FIGS. 7A-7E, subpixels of a pixel are assigned a value representative of a characteristic of a face in proportion to the ratio of the area of the pixel covered by the face to the total area of the pixel. In addition, these values are assigned to subpixels in response to the direction in which an edge of the face traverses the pixel.

For example, for FIGS. 7A-7D the direction along the edge (i.e. solid line having arrowhead) of the face under consideration as indicated by the arrow is to the right. (Remember that when using a clockwise edge convention, the face associated with an edge always lies to the right of the edge when proceeding along the edge in the indicated direction). As increased areas of pixel 40 are covered by the face moving up from the bottom of pixel 40, a value indicative of a characteristic of the face, such as color, is assigned to subpixels of pixel 40 in the bottom row, starting from the right side, or side at which the edge under consideration exits pixel 40, or side at which the edge under consideration enters pixel 40. That is, assignment to subpixels is from the anterior toward the posterior portion of the edge.

Referring to FIGS. 7D and 7E, the edge under consideration lies the same distance from the bottom of pixel 40, but in the opposite direction. Thus, for the edge and face of FIGS. 7D, the bottom row of sub-pixels of pixel 40 is filled with logical 1's and the next row up has two logical 1's, corresponding to the area covered by the face, disposed in the two locations from the right hand boundary (i.e. the side of pixel 40 at which the edge under consideration exits pixel 40, or from the anterior portion of the edge). For the edge and face of FIG. 7E, the, top two rows of sub-pixels 40 are filled with logical 1's and the next row down has to logical 1's, corresponding to the area covered by the face, disposed in the two locations from the left hand boundary (i.e. the side of pixel 40 at which the edge under consideration exits pixel 40, or from the anterior portion of the).

C. BLOCK DIAGRAM FOR DISPLAY PROCESSOR

Figure 8:
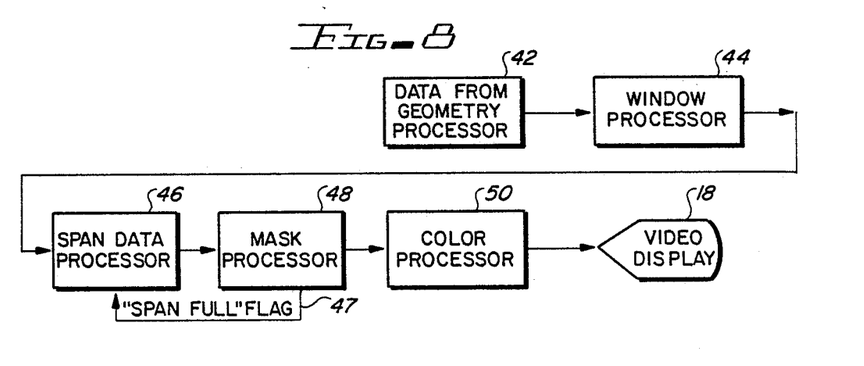
FIG. 8 shows the major tasks of the Display Processor.

FIG. 8 shows the high level flow diagram of the method in which the data from the Geometry Processor 14 (FIG. 1) is processed through the Display Processor 16 (FIG. 1) and output to a video display 18 (FIG. 1). Initially, in step 42, the data from the Geometry Processor 14 is passed to the window processor 44. The window processor 44 identifies those spans which are intersected by each edge of each face. The search is carried out in-viewer space using edge data and span corner coordinates coordinate received from the Geometry Processor 14. The window processor 44 receives and stores edge, point feature, span vertex and face priority data during the Geometry Processor time period. It windows face edges using edge scan to identify all intersected spans therein. Span edge intersections which will contribute zero area to the span face are flagged for later elimination to reduce the mask processor loading and to prevent false faces. False faces are narrow faces which, due to inaccuracies, are not traced in a clockwise edge sequence.

The window data are stored in linked lists by channel spans. Spans are processed in row sequence, left to right within a row. All data within a span are ordered by face priority via a pipeline ordering stack. The window processor 44 fills in covering faces, between face edges, and supresses certain data: lower priority data and spans fully covered by a higher priority opaque face; false faces characterized by edges which do not circumscribe a face in required clockwise sequence; flagged faces which are outside a programmed area of interest; data and spans which are external to the viewer space. The window processor 44 then passes the data on to block 46 the span data preprocessor 46. The span data preprocessor receives data for a span from the window processor 44, and stores it in an active face list. The span data preprocessor controls access to N-interleaved spans, permitting the highest priority face that is in a span to be given to the mask processor block 48, before proceeding to the next span. That face is processed and then processing proceeds to the next span. A second face will not be processed for the N span until all [N-1]other spans with their highest priority face have been processed and a span full status flag 47 has been received back from the mask processor. Note that the highest priority face for a given span may not be the highest priority face of another span. Upon receipt of a span full flag 47, whose status indicates that the span is not full, the span data preprocessor 46 outputs the next face of the given span. Upon receipt of a full span status flag, the span data preprocessor 46 assigns a new span to that interleaved time slot and outputs the first face of the new span. Normally there are N=128 interleaved spans. Near the end of the field, when there can be fewer than 128 spans incomplete, N can decrease progressively to 0. When N is less than 128, the span data preprocessor 46 will output additional faces of the same span without awaiting the full-not full flag feedback. Overall operation will insure that the mask processor 48 functions at maximum efficiency and does not process span faces which do not contribute to the displayed image.

The Mask Processor 48 calculates perpendicular distances from the span corners to edges received from the window processor 44. Distance is interpolated to the center of all pixels. This distance is used to generate and accumulate edge areas of a span face, one edge at a time. Area is resolved to one subpixel. Translucency, programmed from the Geometry Processor (14 (FIG. 1) and computed here, is introduced at the mask processor 48. The mask processor 48 processes all control faces such as lights and flares and stores necessary data for use with subsequent faces of a span. The mask processor 48 includes a subpixel mask memory for the interleaved spans. It provides pixel-pair face areas to the color processor 56 and identifies when processing of a span is complete. ("spanfull flag 47") to the color processor and span data preprocessor 46. A pixel-pair is defined as an area of 4×8 subpixels which comprise the display element, as was shown in FIG. 2.

Referring back to FIG. 8, the Color Processor step 50 receives face colors from the Geometry Processor 14 (FIG. 1), haze colors from the Controller 12 (FIG. 1), and pixel area from the mask processor 48. It uses these data to compute color contribution of the new span face. Interleaved span data are accumulated and stored in a video buffer memory. Upon receipt of a span full flag span color data for that span are output to the video memory block 52.

1. Window Processor

Throughout the geometry processing time the window processor 44 (FIG. 8) receives face edge data from which it generates a list of all spans intersected by each edge.

Figure 9:
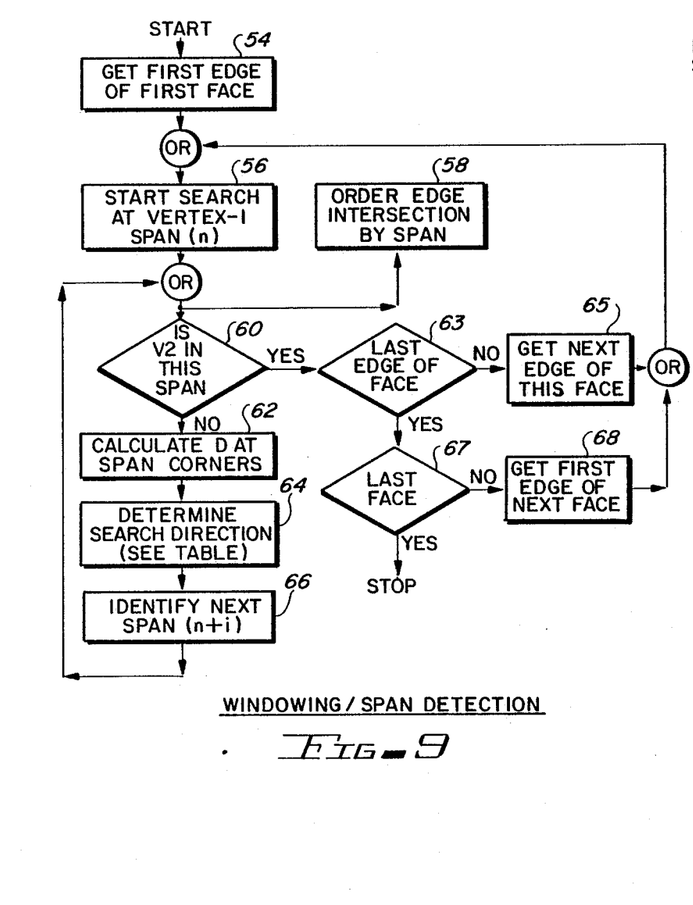
FIG. 9 shows a detailed flow diagram of the window processing.

Referring to FIG. 9 there is shown the process of determining and ordering the edge intersections by span, which is accomplished by the window processor 44 (FIG. 8). Initially at step 54, the window processor gets the first edge of the first face from the Geometry Processor 14 (FIG. 1). The window processor then starts a search at the first vertex that is included within a span. This is shown as step 56. Referring briefly back to FIG. 3, for edge B'-C' this would be vertex B' of face 32. The window processor determines which faces and which edges occur in a span. The window processor orders the edge intersection by span as shown in step 58. In step 60, the window processor determines if the end vertex is in the span. If not, the procedure continues to step 62. At step 62, the distances from the span corners to the edge are calculated, as has been described before, according to equation 1. In step 64, after calculating the distances, the next span to search is given by the unique distances at each span corner via a table lookup as has been described before. Thus, the window processor, after calculating the distances from the span corners to the edge, knows the next direction to search to identify the next span that the edge intersects. This is shown as step 66. Upon determining the next span that the edge intersects, the procedure returns to step 58 in which the edge of a face is ordered by span. The window processor then determines if the end vertex is in the span. Eventually the end vertex will be present in a span and the result of step 60 will be positive and proceeds to step 63. In step 63, the window processor determines if this is the last edge of the face. If not, then the window processor gets the next edge of this face in step 65 and the procedure begins again at step 56. Thus, the window processor determines the spans that an edge intersects and orders those intersection by span. For example, referring briefly to FIG. 3 again, the window processor has started at B' and determined the spans that B'-C' intersect. Upon reaching C' which is the end vertex of B'-C', the window processor then determines the spans that the edge C'-E' intersect. Continuing in this mode, the window processor proceeds in a clockwise direction as is shown by the arrows in FIG. 3 from E' to A' and then from A' back to B'. In this manner, the window processor determines the spans for the intersection of the edges of a face.

Referring to FIG. 9, the window processor then proceeds to the next face which is shown in step 66. If the last face has been processed, the window processor procedure is finished. If the last face has not been processed, the window processor gives the first edge of the next face in step 68 and repeats the procedure of searching and ordering the edges by starting again at step 56. When the window processor has finished detecting the spans, each span will have a list of the edges that intersect that span. The data from the window processor is then passed to the span data preprocessor.

2. Span Data Preprocessor

Figures 10A, 10B:
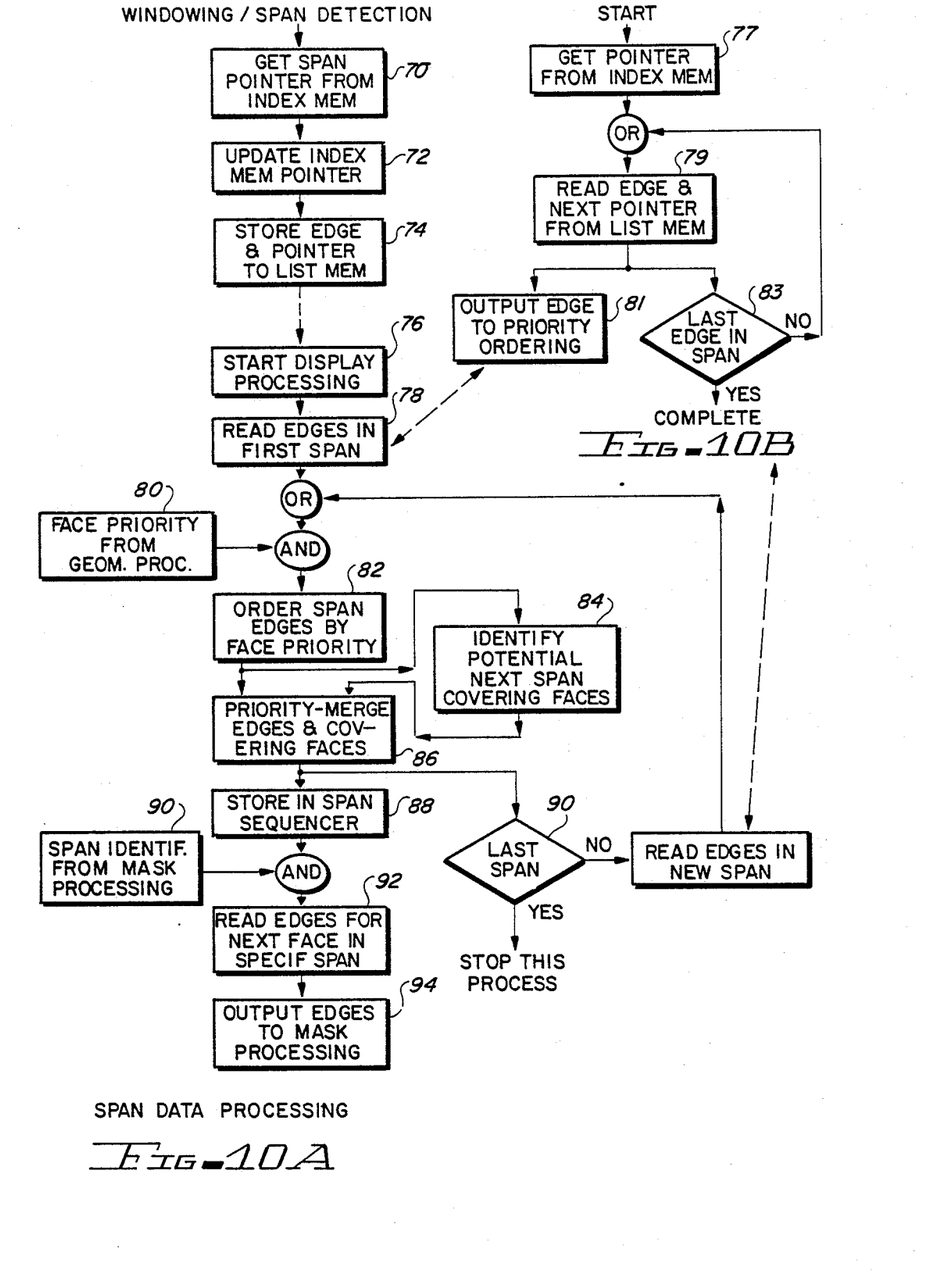
FIGS. 10A and 10B show a detailed flow diagram of the span data preprocessing.

FIG. 10A shows a detailed sequence of operations for preprocessing the span data from the window processor. In step 70, the span preprocessor receives an edge intersection from the window processor and acquires a span pointer or address from the index memory. The index memory is a list by span of the address in list memory where the last edge intersecting that span is stored. Each edge in list memory is accompanied by the list memory address where the previous edge intersecting that span is stored, etc., so that all edges which intersect a span are linked together. In step 72, the index memory is updated to the address in list memory where the edge intersection is to be stored. Storage of edge and link pointer to list memory occurs in step 74. This sequence is repeated for each edge intersection as it is received from the window processor.

After all edges have been windowed and stored in list memory, the span data preprocessor then starts the display processing in step 76. Data is processed in span row sequence, one span at a time, proceeding from left to right along the span row. Edges of the first span are read in step 78. This is shown in more detail in FIG. 10B and includes a first sub-step 77 of getting a pointer from the index memory. In sub-step 79, the edge and next pointer is read from a list memory. The edge data is then provided for priority ordering as shown in sub-step 81, and if this data does not represent the last edge in the span, As shown by decision sub-step 83, the process returns to read the next edge until all edges are done. In this manner, the span preprocessor reads in all the edges for the first span. Block 80 represents the face priority list from the Geometry Processor. As an edge is read from list memory, its face number is used to access face priority from block 80. In step 82, the span data preprocessor orders the edges in the span by decreasing priority. Since all edges of a face will have the same priority number this also accomplishes face ordering, outputting all edges of a face in sequence. After face-priority ordering, the span data preprocessor identifies those faces which potentially cover the next span in the row, step 84. In step 86, edges in the current span are merged, in priority sequence, with covering faces saved from the previous span. Of course, if the current span is the first span in the row, there is no input from step 84. Also, if there is an edge of that same face coming from step 82, the potentially covering face does not cover the span and is discarded. The span preprocessor then stores the results in a span sequencer as shown in step 88. If this is the last span, step 90, the span data preprocessor is finished. If not, the span preprocessor reads in the edges for the next span and processing begins again at step 82 to order the span edges by face priority. In step 88, the ordered span edges are stored in the span sequencer. Block 90 represents receipt of a span identification from mask processing. This is a request for the span sequencer to output the next face in the identified span. The edges of this face are read from span sequencer memory in step 92 and are output to mask processing in step 94.

The span sequencing portion of the span data preprocessor and mask processing work in a feedback pipeline technique. Up to 128 spans are processed at any instant in time, one face of each span being present in the pipeline. The mask processor processes the edges of a face to generate a face mask and to determine the contribution of said face to each pixel of the span. The mask processor also determines when a span is full. If the span is not full the mask processor requests the next face of that span via block 90. If the span is full, the mask processor requests the first face of a new span. Determining a span is full signifies that the colors for each pixel in each span have been determined and that no further processing is necessary on this span. Thus, as can be seen, the processing of the video data is speeded up by stopping the process of determining the colors for each pixel of each span by terminating the span preprocessing when the span is full. Thus, the span preprocessor and mask processor process only those faces necessary to develop a realistic image.

3. Mask Processor

Figures 11A, 11B, 11C:
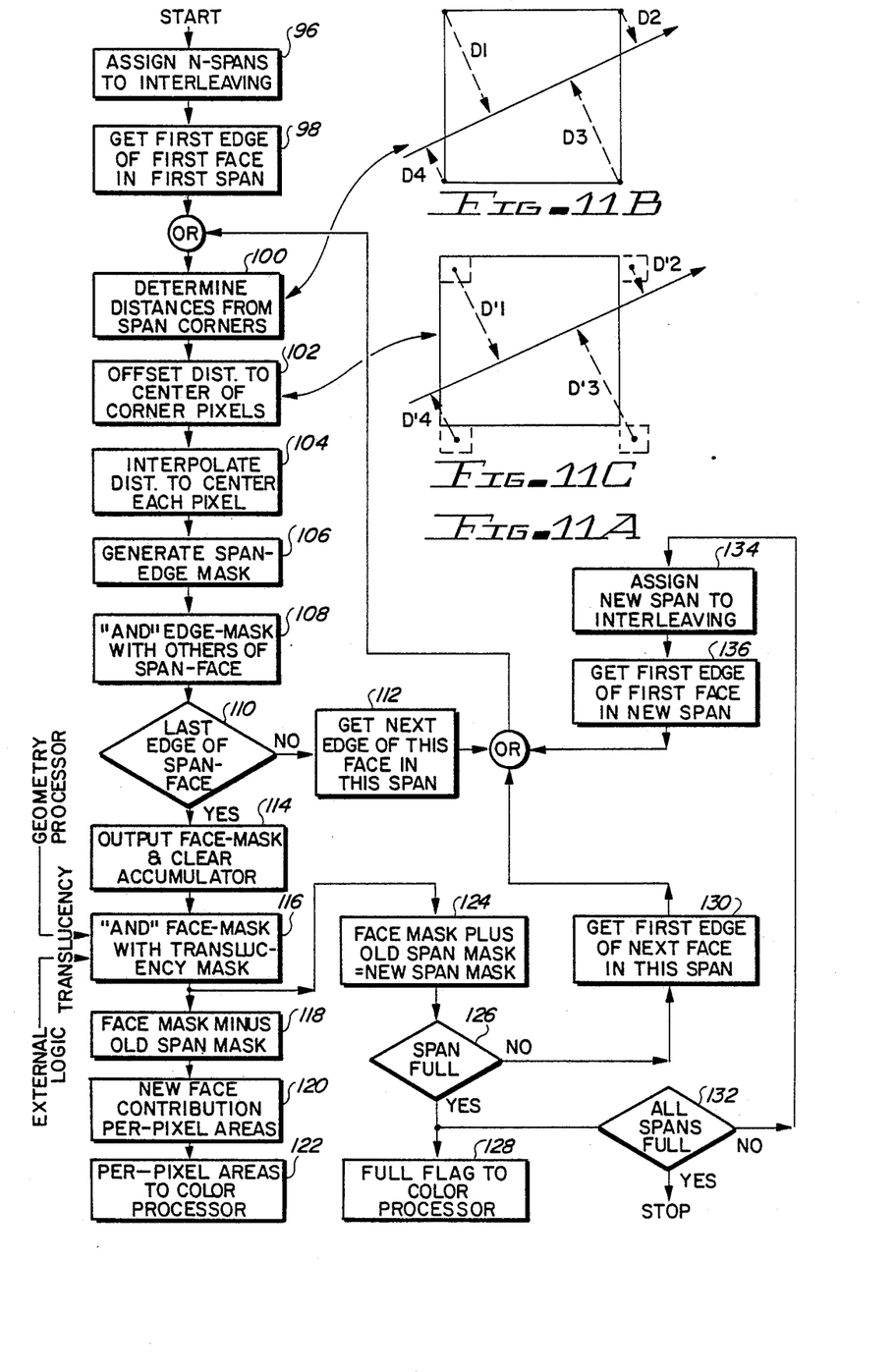
FIG. 11A, 11B and 11C show a detailed flow diagram of the mask processing.

Referring to FIG. 11A, there is shown in detail the processing for the mask processor. At the start of processing, in step 96, the mask processor identifies the first 128 spans to be processed. As processing of individual spans is completed, other spans in the scene are substituted until all spans have been processed. The selected spans are identified one at a time to the span data preprocessor which returns the edges of the first face in that span. The first edge of that first face is received in step 98. The procedure then continues to step 100, which determines the perpendicular distance from the span corners to the edge, as described by equation 1 and shown in FIG. 11B. The offset distance to the center of the corner pixels is then determined in step 102, as shown in FIG. 11C. Referring briefly back to FIG. 6A-C, in our example of determining the color for pixel 40, the offset distance from the center to edge A-B and edge C'-E' has been determined. It has been found that processing time can be further decreased, by interpolating the distance to the center of each pixel, instead of computing the distance to the center of each pixel. Thus, by knowing the distance from the center of each corner pixel to the edge, the distance to the center of any other pixel can be determined by linear interpolation in a manner well known to those skilled in the art.

Referring to FIG. 11A, this is shown in step 104. In step 106, the span edge mask is generated as was described previously. In step 108, the span edge mask is ANDed with others of the span face to determine subpixel weight for the pixel face. In step 110, it is determined if the last edge of the span face has been processed. If not, the next edge of this face in this span is retrieved as shown in step 112 and processing begins again at step 100 to determine the subpixel weight for the pixels of this span. If the last edge of the span face has been processed as referred to in step 110, the face mask is output as shown in step 114. For an edge defined face feature, the steps 100-112 process one edge at a time to generate and accumulate a subpixel span face mask. In step 116, the subpixel span face mask is next ANDed with a subpixel translucency mask for blending applications. Translucency is controlled from the Geometry Processor and/or from external logic. When controlled from the Geometry Processor, translucency is the same for each pixel of the face. When controlled from external logic, translucency may be different for each pixel. This is fully described in U.S. patent application Ser. No. 527,809 filed Aug. 30, 1983, assigned to General Electric Company which is hereby incorporated by reference.

Proceeding to step 118, the old accumulated span mask is subtracted from the new face mask to determine the new face contribution to the image. The contribution of this area, expressed in per-pixel areas, is determined in step 120. This new face contribution is passed to the color processor in step 122. The new face mask is also added to the old accumulated span mask in step 124 to generate a new accumulated span mask. The new accumulated span mask is checked in step 126 to see if it is full. If the span is full, a full flag is sent to the color processor by block 128, in association with the new face area data from step 122. If the span is not full, processing of the span continues. The span is returned to interleaving and the first edge of the next face in this span is accessed in step 130; processing resumes at step 100. If the span is full, it is determined in step 132 whether or not there are any spans left which have not been started. If a span remains, one of these spans is assigned to interleaving in step 134. The first edge of the first face of the new span is acquired in step 136 and processing resumes at step 100. If there are no spans which have not been started, but there are spans in interleaving which have not been completed, one of these spans will be assigned an additional slot in interleaving, to process the next face in that span, etc. When all spans have been completed and none remain in interleaving, mask processing of the field is complete.

The finding of the pixel area is very efficient and lends itself to being implemented in hardware via a ROM (Read Only Memory) lookup table. A pixel to edge distance, and an edge slope are inputs for the address lines of a ROM, and the output of the ROM is the set of subpixel bits that best approximate the area and position of the intersecting edge face. If there is more than one edge of the same face intersecting the span, the process is repeated for each and the several subpixel masks are logically ANDed to approximate the face. If the face is defined as being translucent, the span face subpixels are logically ANDed with a pseudo-random mask whose area, defined to subpixel resolution, corresponds to the face opacity. Thus, the finding of the pixel area for a face can be implemented in hardware in a very fast efficient method.

In addition to the ROM processing for determining the distance D values, the total hardware involved in determining net pixel area for new faces, computing the area-times-color, and modifying the mask memory can be implemented by Very Large Scale Integration (VLSI) circuitry. The hardware involved can be a series of registers, incrementers, value-to logic converters, and ANDing hardware that can be designed in VLSI circuitry in a manner well known to those of ordinary skill in the art. The implementation of the mask processor in VLSI circuitry further decreases the computational time and the hardware circuitry in processing the span data.

To summarize, the mask processor processes all of the faces that lie within a span, in order, starting with the highest priority face and ending with the lowest priority face. As each face is processed, the area of the span covered by the face is saved. As additional faces are processed the total area covered is accumulated in a mask memory. The mask memory is used as faces are processed to prevent low priority faces from being visible where high priority faces have already been painted. In addition, the mask memory is used to determine if the entire span has been covered by faces. Face processing for a span terminates when the span is detected to be completely covered. All remaining faces for the span are discarded, since they can not possibly contribute anything to the span. Each face that is found to contribute to the span is sent on, along with its area mask to the span processor.

The span processing steps are implemented using a pipeline. The face is fed into the pipeline one edge each clock time, so that the face rate varies with the number of edges. After an N clock time pipeline delay, the face comes out of the end at a rate of one face every two clock times. N consists of two delays, N1 and N2, in series. N1 acts as a FIFO and provides the function of rate buffering, between the variable input rate and the fixed output rate. N2 is a fixed delay corresponding to the delay through the texturing function, described in U.S. patent application Ser. No. 527,809 which has been incorporated by reference, which provides synchronism between the mask processor and texture generator. Total delay, N clock times, is chosen sufficiently high to maintain continuous outputs, one face each two clock times, with a high level of confidence. Normally this is sufficient to hold faces for 128 interleaved spans. When necessary, the input is held up so as not to exceed this. Very occasionally, if there are a large number of faces each with a large number of edges being input, it may be necessary to hold up the output. However, this combined delay is a key feature of this processing and guarantees that time is efficiently used. Another key aspect of this delay is that, as soon as a span is detected to be completely covered, all subsequent faces are discarded immediately, further guaranteeing efficient operation.

It is impossible to know the translucency of a cell textured face, such as smoke, when the face is put into the pipeline. All of the texture calculations occur inside the pipeline delay. As soon as the cell textured face gets through the pipeline the per-pixel translucency information is available and can be used to determine if the span has been covered and, if so, to terminate any successive faces for the span. Without span interleaving, all faces that are lower priority than the cell textured face would have to be put into the pipeline immediately after the cell textured face is put in. If the cell textured face turned out to be opaque, then the succeeding faces would not be used and efficiency would be lost while the pipeline was being cleared.

To eliminate this problem, interleaving of spans is done. A list of faces for a span is generated, and stored in memory. Subsequent span face lists are stored as they are generated in the same memory. All of the faces for a span are linked together with pointers, and a separate set of pointers serve to identify the first face of each span. The span data preprocessor which feeds the mask processor, uses these pointers to feed the highest priority faces to the mask processor, one face at a time. These pointers are updated as they are used, to point to the second face for the span. The control mechanism implements a round-robin sampling of faces in a set of N spans. The number N is determined by the length of the mask processor pipeline, which depends on the particular implementation. Mask memory for all N spans is maintained, so as a face is pulled from the list, the covered test can be performed to determine if the face is to be discarded or put in the pipeline. If the span is determined to be covered, or if the last face for a span is pulled from memory and processed, then a new span list is substituted for the completed span during the round-robbin sampling. This approach gives 100 percent efficiency if the span face lists are stored in memory at a higher rate than span completion.

When one of the N spans in the round-robin processing is full, then its associated array of per-pixel area is output to the color processor. The mask memory for the span is cleared, and then re-used for the next assigned span.

4. Color Processor

Figure 12:
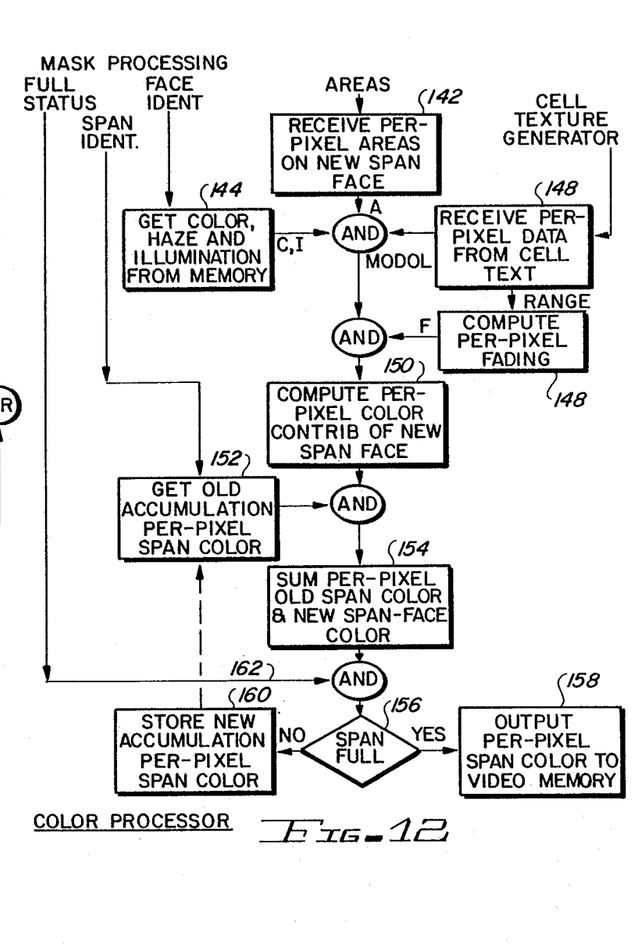
FIG. 12 shows a detailed flow diagram of the color processing.

FIG. 12 shows the flow diagram for the color processor 50 (FIG. 8) in detail. In step 142, the data from the mask processor is received which is the per pixel areas of the new span face. The color processor receives the per pixel modulation and range data from the mask processor, face colors from the Geometry Processor, haze colors from the Controller. It uses these data to compute per pixel color (red, green, blue) contribution of the new span feature. Successive span color data are accumulated and stored in a video buffer memory. Upon receipt of a span full flag, the span color data are output to the video memory. In step 144 data including face color, haze color, and illumination are selected for the current face from data previously processed or received from the Controller and Geometry Processor. Per-pixel modulation and range data are received from external logic described in U.S. patent application Ser. No. 527,809 in step 148. Modulation is typically used to simulate texturing and/or curved surface shading but is not limited to this. Range, is linearly interpolated and used in step 148 to determine per-pixel fading due to simulated haze or fog.

The color processor then computes the per pixel color contributions of the new span face as shown in step 150. This new color contribution, plus the old accumulated per-pixel span color, as shown in step 152, is summed as shown in step 154. The sum of the per pixel old span color and the new span face color are then output to the video memory, as shown in step 158, if the span is full as determined by previous step 156. If the span is not full, the new accumulation of the per pixel span color is stored in step 160, for later combination with the next face of this same span. The red, green and blue span intensity components calculated for the current face span are accumulated with the intensity components for the previous span faces as shown in steps 150, 152 and 154. Upon receipt of a full status from the mask processor as shown by line 162, the color processor outputs the new pixel colors to the video memory as shown in 158, thus, the span is updated on the video display to be seen by the user.

Thus, although the best modes contemplated for carrying out the present invention have been herein shown and described, it will be apparent that modification and variation may be made without departing from what is regarded as the spirit and scope of the invention.

What is claimed is:

1. In an image generating system of the type for converting digital data into a sequence of display frames of image data suitable for display on a video image system, the image system forming a display by individually illuminating each of a plurality of color pixels, each of the frames of image data defining a plurality of faces and each of the frames being divided into a plurality of spans, a method for determining the faces to be displayed in each of the spans comprising the steps of:
   (a) identifying data for one of the frames of display, the data defining face locations, each of the faces associated with at least one span and being arranged in a descending order of priority;
   (b) determining the highest priority face for each span;
   (c) determining an area within each span covered by the highest priority face;

(d) computing pixel image data representative of the pixels within each span covered by the highest priority face of the span;

(e) repeating step (b) through step (d) for each span by replacing the highest priority face of each span with the next highest priority face not having been processed until the last face of each span is processed into pixel image data or until all areas of each span are fully covered by faces and the corresponding pixel image data have been computer; and (f) transferring the pixel image data to the video image system;

wherein he step of determining an edge further comprises the steps of:

identifying data representative of an edge of a face, each edge having a beginning and ending vertex and a slope;

searching along the edges of a face in a predetermined direction, starting with a beginning vertex of an edge of the face, for each span that the edge passes through;

storing each span intersected by the edge;

calculating a perpendicular distance from each corner of each intersected span to the edge;

determining a next span intersected by an edge;

repeating the steps of searching, storing, calculating and determining a next edge until the last edge of the face is processed; and repeating the steps of searching, storing, calculating, determining a next edge and repeating using the next face, until all the faces are processed.

2. The method of claim 1, wherein the step of calculating further comprises the steps of:

obtaining data representative of the slope of an edge and the endpoints of the edge;

calculating the perpendicular distance from the corner of each span according to the formula D=LO+LI*I+LJ*J, where:

D is the perpendicular distance from a point (I,J) to an edge;

LO is an initial predetermined distance from a fixed reference point such as I=0 and J=0;

LI is the cosine of the edge slope; and

LJ is the sine of the edge slope; and supplying data representative of the perpendicular distance from the corner of a span to an edge.

3. The method of claim 1, further comprising the steps of:

(g) determining a span to be processed based upon data representative of the area covered by previously processed faces;

(h) the edges of the highest priority non-processed face intersecting a span;

(i) determining the portions of the span covered by the face defined by the recalled edges; and (j) repeating steps (g) of determining through step (i) of determining until all areas of all spans are covered or until all faces are processed.

4. The method of claim 3, wherein the step (i) of determining the portions of the span further comprises the steps of:

(k) determining a pixel of a span intersected by an edge of a face;

(l) dividing the pixel into a plurality of subpixel areas;

(m) computing a distance from the center of each pixel area to the edge;

(n) determining the subpixel areas covered by the face bounded by the edge;

(o) computing a weight for each sub-pixel area from the area covered by the face and the color of the face;

(p) repeating step (l) of dividing through step n of computing for each edge through the pixel;

(q) summing the weighted values for each pixel;

(r) generating a color for each pixel corresponding to the summed weighted values; and repeating step (k) through step (r) for each pixel intersected by an edge in the span.

5. The method of claim 4, wherein the step (q) of summing further comprises the steps of:

receiving data representative of a translucency of a face in a subpixel area;

summing the translucency of the subpixel of the face with the weighted value for the subpixel area to obtain a translucency weighted value.

6. The method of claim 4, wherein the step (m) of computing, further comprises the step of computing the distance from the center of a subpixel area to the edge by bilinear interpolation of the distances from the corners of the pixel to the edge.

7. The method of claim 6, further comprising the step of receiving data representative of a translucency of a face in a subpixel area based upon a programmatic event, the programmatic event representative of smoke, fog and events characteristic of simulated warfare.

8. The method of claim 4, wherein the step (n) of determining, further comprises the step of determining the subpixel areas assigned to the face as a function of the distance to the edge and slope of the edge.

9. The method of claim 4, wherein the step (m) of computing, further comprises the steps of:

calculating the perpendicular distance from the corner of each span according to the formula D=LO=LI*I+LJ*J, where:

D is the perpendicular distance from a point (I,J) to an edge;

LO is an initial predetermined distance from a fixed reference point such as I=0 and J=0;

LI is the cosine of the edge slope; and

LJ is the sine of the edge slope; and determining the subpixel areas assigned to the face in response to the distance to the edge and the slope of the edge.

10. The method of claim 9, further comprising the step of determining the accuracy of a subpixel area assigned to the face by a total area accuracy of at least one-half subpixel area.

11. The method of claim 10, further comprising the step of determining the accuracy of a subpixel assigned to the face by a positioned accuracy of at least one subpixel.

12. The method of claim 4, wherein the step (o) of computing, further comprises the step of computing a weight for each subpixel representative of the area covered by a face times the color.

13. The method of claim 1, wherein the step of transferring, further comprises the steps of:

receiving modification data for a pixel, the modification data including a haze control, an illumination control and a texture control;

computing a color contribution for the pixel image data from the modification data and the previous pixel image data; and transferring the color contribution of the pixel image data to the video display.

14. The method of claim 1, wherein the step of calculating, further comprises the step of determining the intersection of the edge of the face with a subsequent span from the distance for each previous span corner to the edge and the slope of the edge.

15. The method of claim 14, further comprising the step of determining the intersection of the edge with a subsequent span from look up table data in a memory.

16. The method of claim 15, wherein the memory is a read only memory, further comprising the steps of:
   inputting into the address lines of a read only memory, data representative of the slope of the edge and the endpoints;
   calculating the perpendicular distance from the corner of each span according to the formula $D=LO=LI*I+LJ*J$, where:
   D is the perpendicular distance from a point (I,J) to an edge;
   LO is an initial predetermined distance from a fixed reference point such as I=0 and J=0;
   LI is the cosine of the edge slope; and
   LJ is the sine of the edge slope; and
   (c) outputting from the data lines of the read only memory, data representative of the subsequent span intersected by an edge of a face.

17. A method for attributing a value to a pixel when an edge of a face intersects the pixel, the face having a predetermined characteristic, wherein the pixel includes a predetermined number of subpixels and further wherein the value attributed to the pixel is representative of a predetermined combination of the characteristic assigned to each subpixel of the pixel, comprising:
   assigning the predetermined characteristic to each subpixel that lies entirely on one side of the edge, wherein the one side is determinable with respect to a predetermined direction along the edge;
   assigning the predetermined characteristic to subpixels intersected by the edge in proportion to the area of subpixels intersected by the edge, the area lying on the one side of the edge; and
   attributing the value to the pixel in response to the predetermined combination of the characteristic assigned to each subpixel of the pixel;
   whereby a smooth transition between pixels along an edge is obtained.

18. The method as in claim 17, wherein the step of assigning to subpixels includes assigning the predetermined characteristic to subpixels from the anterior to the posterior portion of the edge with respect to the predetermined direction along the edge.

19. The method as in claim 18, wherein the step of assigning to subpixels further includes assigning the predetermined characteristic to a number of subpixels intersected by the edge equal to the integer portion of the sum of the areas of the subpixels intersected by the edge and lying on the one side of the edge when the edge is substantially parallel to a side of the pixel and further assigning the predetermined characteristic to another subpixel intersected by the edge when the fractional portion of the sum of the areas of the subpixels intersected by the edge and lying on the one side of the edge is greater than about one-half subpixel.

* * * * *

UNITED STATES PATENT AND TRADEMARK OFFICE
CERTIFICATE OF CORRECTION

PATENT NO. : 4,811,245
DATED : 3-7-89
INVENTOR(S) : William M. Bunker et al

It is certified that error appears in the above-identified patent and that said Letters Patent is hereby corrected as shown below:

Column 17, line 14, delete "he" and substitute --the-- therefor.

Column 19, line 14, delete "the" (second occurrence), and substitute --an-- therefor.

Signed and Sealed this

Nineteenth Day of September, 1989

Attest:

DONALD J. QUIGG

Attesting Officer

Commissioner of Patents and Trademarks